United States Patent
Setbacken et al.

(10) Patent No.: US 6,175,109 B1
(45) Date of Patent: Jan. 16, 2001

(54) ENCODER FOR PROVIDING INCREMENTAL AND ABSOLUTE POSITION DATA

(75) Inventors: Robert Setbacken, Santa Barbara, CA (US); Donald E. Barnett, West Chester, PA (US)

(73) Assignee: Renco Encoders, Inc., Goleta, CA (US)

( * ) Notice: Under 35 U.S.C. 154(b), the term of this patent shall be extended for 0 days.

(21) Appl. No.: 09/212,782

(22) Filed: Dec. 16, 1998

(51) Int. Cl.[7] .................................................. G01D 5/34
(52) U.S. Cl. .................. 250/231.13; 250/231.18
(58) Field of Search .................. 250/231.13, 231.14, 250/231.16, 231.18; 356/373, 375; 341/13

(56) References Cited

U.S. PATENT DOCUMENTS

| | | |
|---|---|---|
| 4,423,958 | 1/1984 | Schmitt . |
| 4,700,062 | 10/1987 | Ernst . |
| 4,712,088 | 12/1987 | Ernst . |
| 5,061,073 | 10/1991 | Michel . |
| 5,274,229 | 12/1993 | Khan . |
| 5,553,390 | 9/1996 | Ernst et al. . |
| 5,651,187 | 7/1997 | Affa . |
| 5,936,236 | * 8/1999 | Setbacken et al. ............. 250/231.13 |

OTHER PUBLICATIONS

U.S. Patent Application Serial No. 08/782,050, filed Jan. 10, 1997, by Setbacken et al.
U.S. Patent Application Serial No. 08/929,539, filed Sep. 15, 1997 by Setbacken et al.
U.S. Patent Application Serial No. 08/980,047, filed Nov. 26, 1997, by Setbacken et al.

* cited by examiner

*Primary Examiner*—Seungsook Ham
*Assistant Examiner*—Kevin Pyo
(74) *Attorney, Agent, or Firm*—Brinks Hofer Gilson & Lione

(57) ABSTRACT

An optical encoder has a single data track which is scanned photoelectrically by a scanning unit. The data track consists of an incremental track and a plurality of overlying code tracks so that it is possible to generate incremental output signals as well as at least coarse absolute positional information by scanning only one track. The scanning unit comprises a first detecting unit with a phased array of photodetectors to scan the incremental graduation. A second detecting unit with a plurality of photodetectors is provided for scanning the code tracks. The code tracks can be used to generate commutation signals for brushless motors.

24 Claims, 5 Drawing Sheets

A

B

U

V

W

Z

ENCODER FOR PROVIDING INCREMENTAL AND ABSOLUTE POSITION DATA

This invention relates to position sensors or encoders which produce electrical signals indicative of the position of a moving object. In particular, the invention relates to an encoder that provides incremental position data as well as coarse absolute position data.

BACKGROUND OF THE INVENTION

From the prior art there are rotary encoders known which provide incremental output signals as well as coarse absolute output signals, e.g. commutation output signals. Commutation output signals are necessary in brushless motors where commutation is performed by electronically steering drive current in the motor to the appropriate winding. For this purpose the absolute rotor position has to be determined with a certain accuracy.

There are different ways known from the prior art how to generate the commutation output signals. In a typical method, Hall switches are used to determine the absolute rotor position. The Hall devices are arranged on a circuit board, which is aligned with a magnet on the rotor so that a defined relationship between the Hall outputs and the motor back EMF can be established. This solution has the disadvantage that additional room must be made for the commutation circuit board and for the encoder. In addition, Hall devices are sensitive to acoustic noise, current spikes, temperature and can be difficult to align.

Because of these disadvantages, encoders were developed which provide incremental output signals as well as commutation output signals from a single code wheel. Encoders of this type are sold, for example by the assignee of the present application. Pending patent application Ser. No. 08/980,047, U.S. Pat. No. 5,936,236 assigned to the present assignee describes such an encoder type.

The code wheel of these encoders usually has an incremental track, and at least three additional code tracks for generating the commutation output signals. This results in a minimum of four data tracks arranged concentrically on the code wheel. To provide the incremental output signals from the incremental track at least two photodetectors are necessary which are arranged in a spatial relationship so that two incremental signals are generated which have a phase shift of 90° with respect to each other. For the commutation output signals, each of the code tracks is scanned by a further photodetector which provides either a HIGH output or a LOW output. The combination of the three commutation output signals allows determination of the absolute rotor position within a certain range.

SUMMARY OF THE INVENTION

It is an object of the invention to provide a very compact encoder which is able to generate incremental output signals as well as coarse absolute output signals.

It is another object of the invention to provide a very compact rotary encoder which generates incremental output signals as well as commutation output signals which can be used to commutate a brushless motor.

It is a further object of the present invention to provide an encoder which delivers incremental output signals as well as coarse absolute output signals and which allows very small optics to be incorporated.

An optical encoder according to the present invention is able to provide absolute and incremental positional information of an object which moves along a certain measuring direction. The encoder has a single data track positioned along the measuring direction, having a fine incremental track and a plurality of separate coarse code tracks overlying said incremental track. A light source is provided for emitting light in the direction of the data track. A first detecting unit is arranged with respect to the data track for receiving light modulated by said incremental graduation. The first detecting unit consists of an array of separate photodetectors, each of the photodetectors providing phase shifted incremental signals. A second detecting unit is arranged with respect to the data track for receiving light modulated by said at least three separate coarse code tracks. The second detecting unit has a number of separate photodetectors and the number of photodetectors is equal to the number of coarse code tracks.

BRIEF DESCRIPTION OF THE DRAWINGS

These and other features and advantages of the present invention will be appreciated as the same becomes better understood by reference to the following detailed description when considered in connection with the accompanying drawings.

DETAILED DESCRIPTION OF THE PREFERRED EMBODIMENTS

Figure 1:
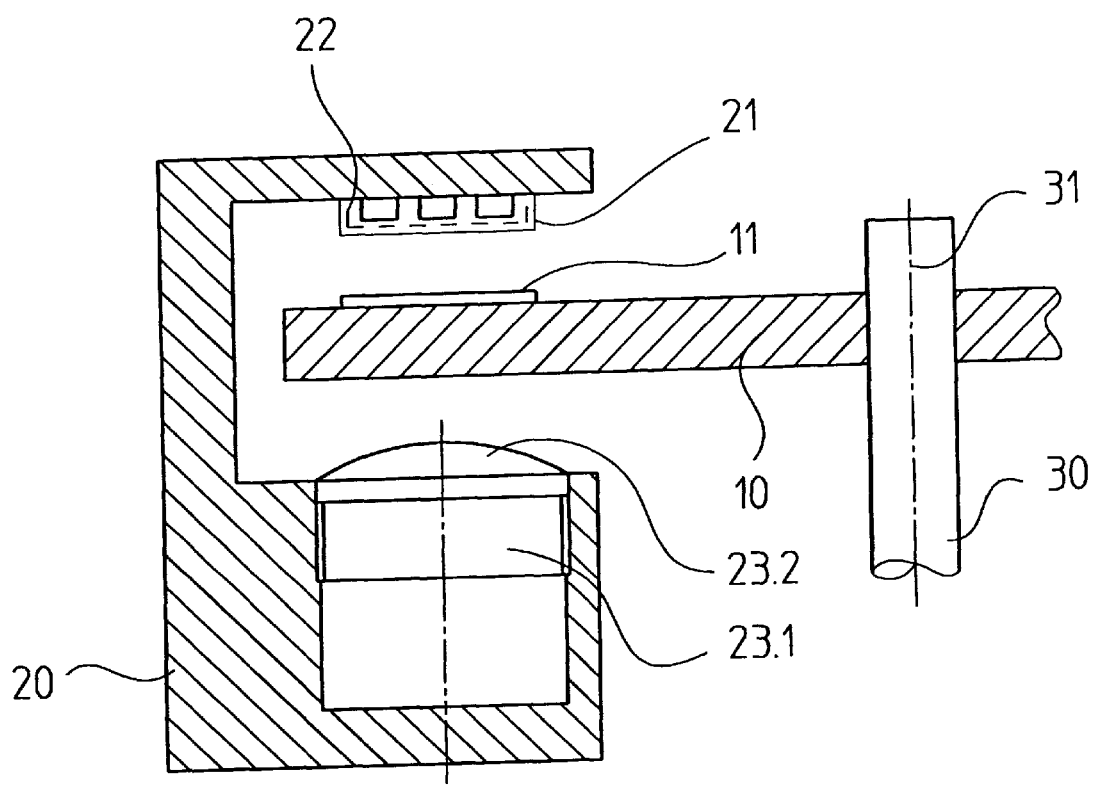
FIG. 1 illustrates schematically a cross section of an optical encoder according to a preferred embodiment of the present invention.

FIG. 1 illustrates schematically a cross section of an optical encoder according to a preferred embodiment of the present invention. The optical encoder is a rotary encoder and as described below is able to generate positional information with respect to the movement of two rotating objects. The encoder can be used, for example, in applications together with brushless motors.

The optical encoder of this preferred embodiment includes a code wheel 10 with a single data track 11, the code wheel 10 being mounted on a shaft 30 which rotates around axis 31. The rotating shaft 30 can be the rotor of a brushless DC motor for example. Furthermore, the encoder has a scanning unit 20 for photoelectrically scanning the data track 11. The scanning unit 20 comprises two detecting units 21, 22, a light source 23.1 and a lens 23.2, preferably a condenser lens. In the embodiment of FIG. 1 the data track 11 of the rotating code wheel 10 is arranged between light source 23.1 and condenser lens 23.2 on one side and the detecting units 21, 22 on the other side. The emitted light of the light source 23.1 is collimated by condenser lens 23.2 and transmitted through data track 11 on the code wheel 10. The detecting units 21, 22 receive the light which is modulated by the data track 11 if the code wheel 10 rotates. The detected signals are processed in an evaluation unit which is not shown in FIG. 1.

The encoder structure is illustrated only schematically because details of mechanical construction are well known to those of ordinary skill in the art.

It should be mentioned furthermore that the present invention is not limited to rotary encoders. It is also applicable in linear encoders with linearly arranged data tracks. Additionally it should be mentioned that different optical principles can be realized on the basis of the present invention, such as transmitted light arrangements as described in FIGS. 1–5 as well as reflected light arrangements.

Details of the inventive data track and the inventive detector unit arrangement will be described now with reference to FIG. 2, 5 and the following FIGS. 3, 4 which show details of FIG. 2 in enlarged views.

Figure 2:
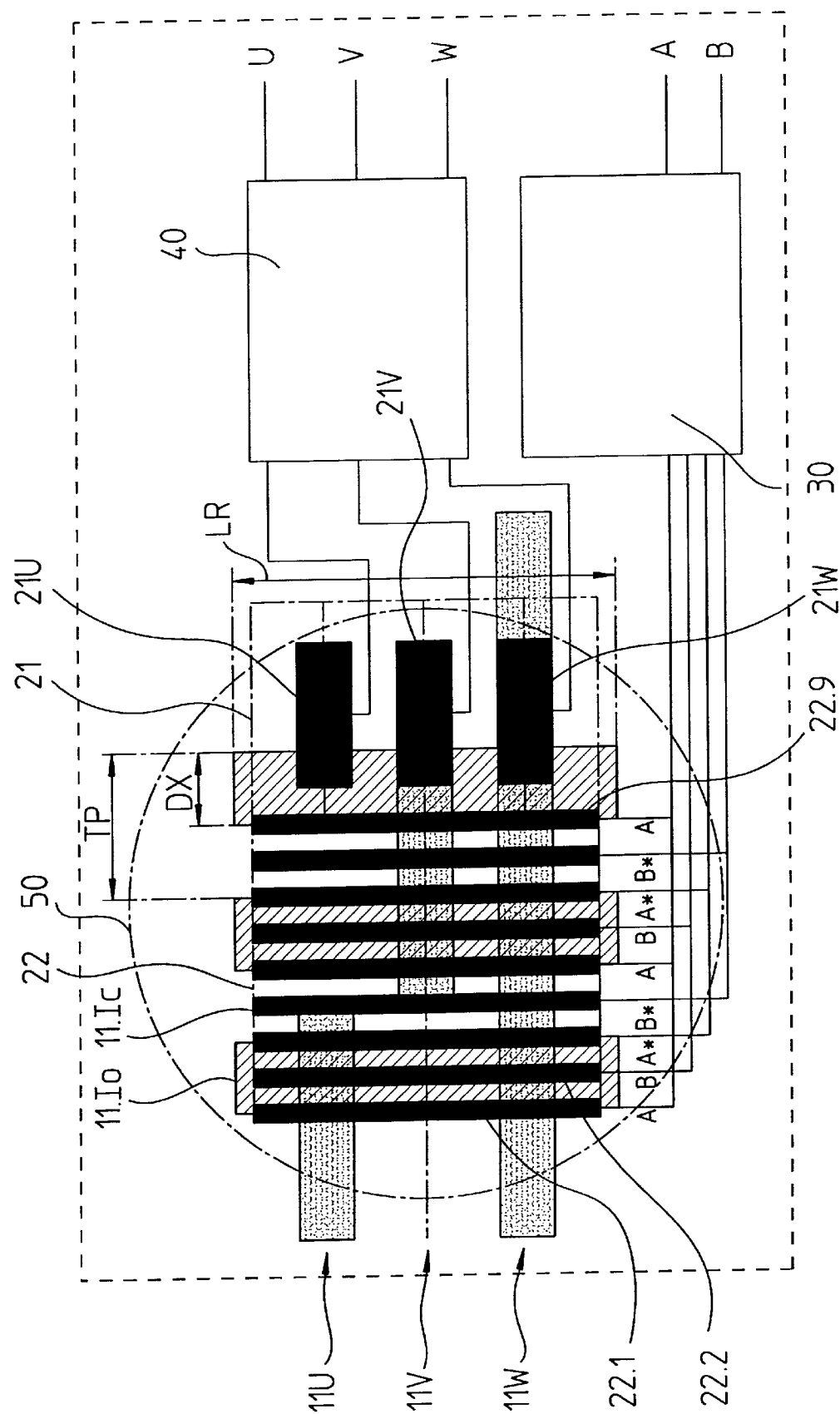
FIG. 2 is a schematic illustration of a view onto the detector units and the scanned single data track.

FIG. 2 is a schematic illustration of a view onto the detector units 21, 22 and the single data track 11 which is photoelectrically scanned by the detector units 21, 22 when the code wheel rotates. Furthermore a part of the signal processing electronics 30, 40 is schematically illustrated in FIG. 2. The circle 50 in FIG. 2 should indicate the area on the single data track 11 on the code wheel which is illuminated by the light source and which is scanned by the detector units 21, 22 to generate position dependent output signals.

The single data track 11 of the inventive rotary encoder is arranged along the measuring direction of the encoder. In the present case of a rotary encoder the measuring direction is defined by the circumferential arrangement of the data track on the code wheel. If the present invention is used in connection with a linear encoder the measuring direction is given by the linear direction of motion of the scanning unit with respect to a linear scale. In general the measuring direction is defined by the direction of movement of the data track and the scanning unit.

The data track 11 according to the present invention has a first graduation which is embodied as fine incremental track with a defined incremental graduation period TP. Accordingly this track serves to generate incremental output signals which are indicative of the relative position of two objects which are moving with respect to each other. The incremental track consists of opaque and clear areas 11.lo, 11.lc which are alternately arranged in the measuring direction on the code wheel. In a preferred embodiment the incremental track consists of opaque chromium lines arranged on a transparent glass substrate. Opaque and clear areas 11.lo, 11.lc both have the same width DX in the measuring direction and the same length LR perpendicular to the measuring direction. As indicated in FIG. 2 the graduation period TP is given by the addition of the widths DX of adjacent clear and opaque areas 11.lo, 11.lc; e.g., TP=2 * DX. In a preferred embodiment the graduation period TP is chosen to be TP=40 $\mu$m, however, other graduation periods are possible.

The single data track of the inventive encoder has additional coarse graduations which are embodied as coarse code tracks 11.U, 11.V, 11.W and which are overlying the fine incremental track. These code tracks 11.U, 11.V, 11.W are used to generate coarse absolute position information with respect to the rotary movement of the code wheel. In the preferred embodiment of FIGS. 2–4 there are three coarse code tracks 11.U, 11.V, 11.W shown which are especially suitable to generate commutation signals U, V, W (FIG. 5) having a certain phase shift with respect to each other. From the commutation signals U, V, W a coarse absolute position value can be determined in a suitable processing electronics in a matter which is known to those of ordinary skill in the art. Each of the coarse code tracks 11.U, 11.V, 11.W has alternately arranged clear and opaque areas 11.Uc, 11.Uo, 11.Vc, 11.Vo, 11.Wc, 11.Wo. These areas all have the shape of arc segments which is shown in FIG. 4. The segment angle of all these areas is chosen identically in the described embodiment.

Figure 4:
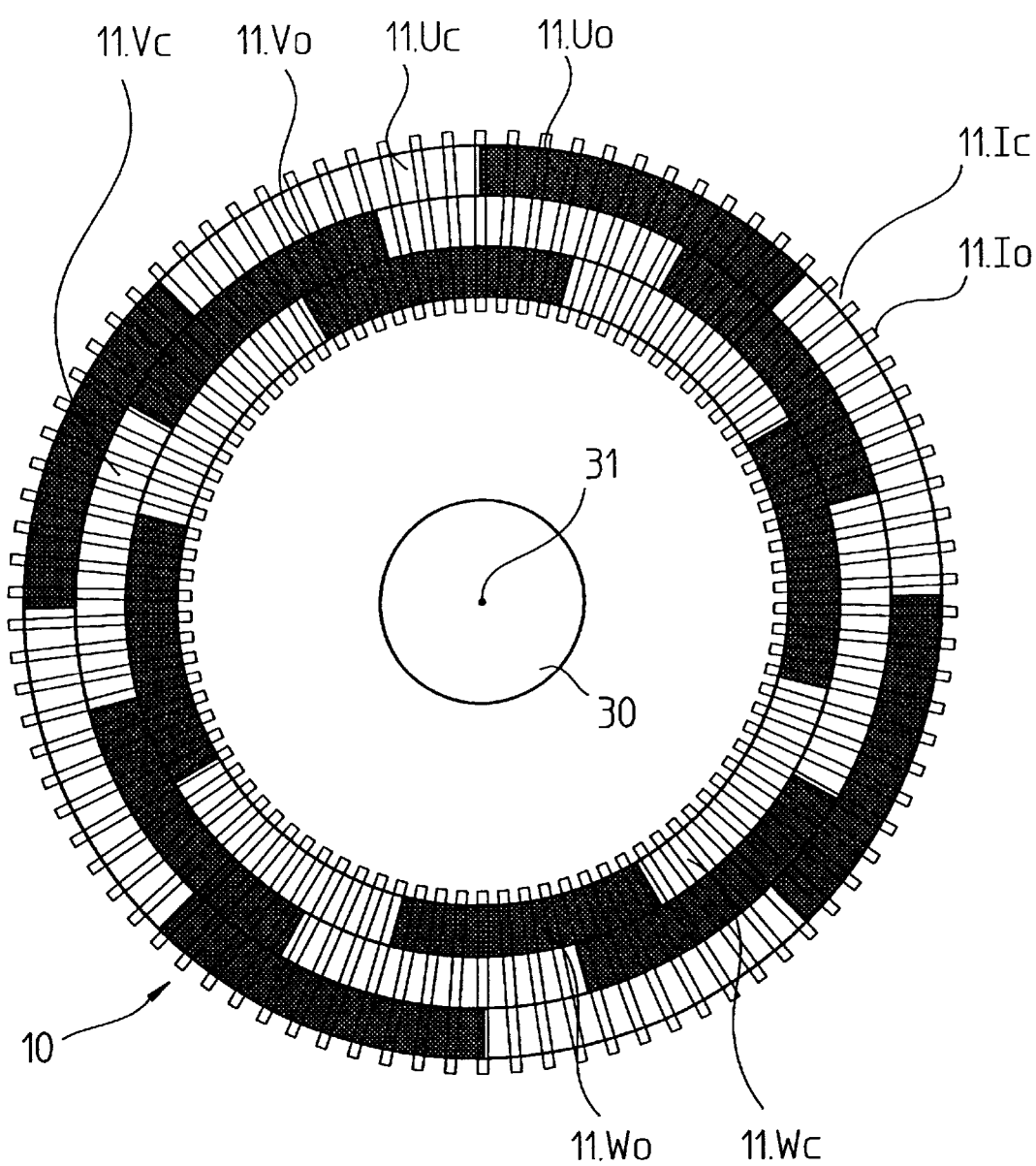
FIG. 4 is a view of the code wheel of a preferred embodiment of the present invention.

As can be seen in FIG. 4 the three code tracks 11.U, 11.V, 11.W are arranged circumferentially around the rotational axis 31 with a relationship to each other so that a coarse absolute position within a certain angular range can be determined. For that purpose the output signals of the three detectors which are used to scan the coarse code tracks are combined logically in a well known manner.

In this embodiment of the inventive encoder four opaque areas 11.Uo, 11.Vo, 11.Wo and four clear areas 11.Uc, 11.Vc, 11.Wc, are arranged alternately in each code track 11U, 11.V, 11.W. Each of these code areas 11.Uc, 11.Uo, 11.Vc, 11.Vo, 11.Wc, 11.Wo covers an arc segment of 45°. The code areas 11.Uc, 11.Uo, 11.Vc, 11.Vo, 11.Wc, 11.Wo of adjacent code tracks are shifted with respect to each other by 30°. This configuration provides a resolution of 15° with each 90° segment, and is suitable for commutation of an 8-pole brushless motor. This pattern can be modified to repeat every 120° or every 180° for commutation of 6- or 4-pole motors, respectively.

Figure 3:
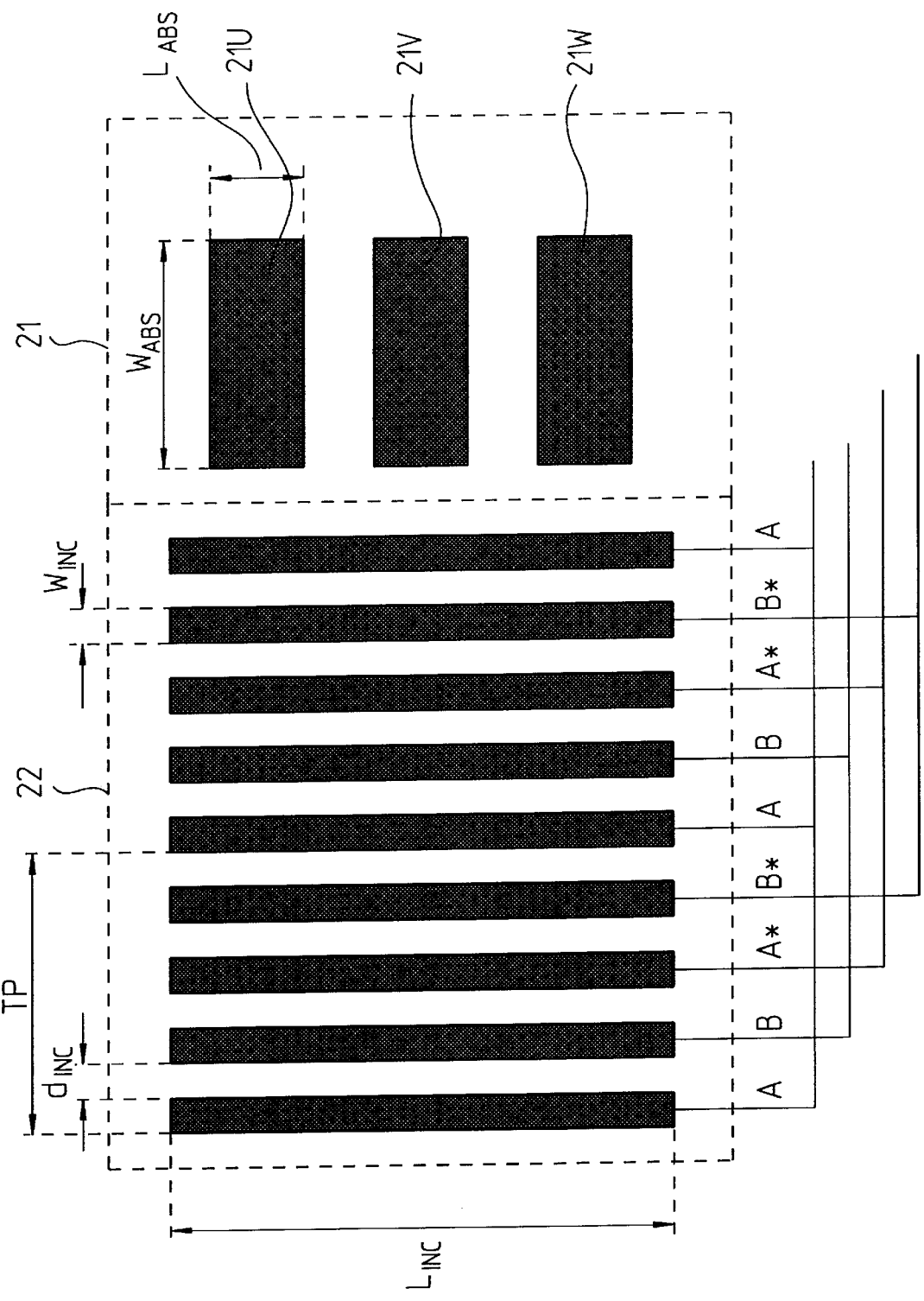
FIG. 3 is a view of the detector units shown in FIG. 2.

As can be seen from the FIGS. 2–4 described above the inventive encoder integrates an incremental track and a plurality of separate code tracks within one single data track. Accordingly both tracks exist in the same space so that it becomes possible to build a very compact optical encoder. It is only necessary to illuminate a relatively small area on the code wheel, which allows a smaller optic assembly to be incorporated in the inventive encoder.

Now the arrangement of the detecting units should be described which are provided in the inventive encoder to scan the single data track 11 on code wheel 10.

Two detecting units 21, 22 are shown in FIG. 2 together with the single data track in the illuminated area. Further details can be derived from the enlarged view of the detecting units 21, 22 in FIG. 3.

A first detecting unit 22 is used to scan the incremental track of data track 11 and to provide incremental output signals A, B which are phase shifted by 90°. For this purpose the first detecting unit 22 comprises an array of separate photodetectors 22.1–22.9. In FIG. 2 only a part of all the photodetectors is shown for reasons of clarity. In a preferred embodiment the first detecting unit 22 has e.g. 100 separate photodetectors. All photodetectors of the first detecting unit 22 have a rectangular shaped light sensitive area. The longitudinal axis of the rectangular shaped photodetectors is oriented perpendicular to the measuring direction. The photodetectors 22.1–22.9 have a length $l_{INC}$ and a width $W_{INC}$ whereas adjacent photodetectors 22.1–22.9 are arranged in a distance $d_{INC}$ with respect to each other. In a preferred embodiment these parameters of the first detecting unit are chosen as follows:

$l_{INC}$=890 $\mu$m $W_{INC}$=5 $\mu$m $d_{INC}$=5 $\mu$m

In connection with a graduation period TP=40 $\mu$m as mentioned above this arrangement provides signals from adjacent photodetectors which are phase shifted with respect to each other by 90°. The photodetectors are arranged in groups of four so that one group of photodetectors generates incremental output signals A, B, A*, B*. These signals are derived from one grating period TP of the incremental track on the code wheel so that a so called "one-field-scanning" arrangement results. It offers significant advantages with respect to the influence of possible contaminations on the code wheel.

In this arrangement signal B has a phase shift of 90°, signal A* a phase shift of 180° and signal B* a phase shift of 270° with respect to the phase of signal A which is generated by the first photodetector of each group. Those photodetectors of all groups are connected electrically with each other which provide incremental output signals with the same phase relationship. So, for example, photodector 22.1 of the first group and photodetector 22.5 of the second group are connected with each other etc. The resulting four incremental output signals A, B, A*, B* are further processed in conventional manner in a push-pull circuit within a subsequent processing unit 30. The output signals A, B of the processing unit 30 are incremental signals with balanced amplitudes which are phase shifted with respect to each other by 90°. If the resulting resolution of the graduation period is not high enough it is possible to interpolate these signals. Depending on the subsequent electronics the incremental signals A, B generated by the processing unit may be TTL square wave signals or sine shaped signals.

As already indicated above the suggested arrangement of the first detecting unit for scanning the incremental track offers certain advantages if the graduation is contaminated locally. In this case all signals are influenced in the same way so that very stable incremental scanning signals result even in this case.

It can be seen in FIG. 2 that the length LR of the incremental graduation is chosen bigger than the length $I_{INC}$ of the photodetectors of the first detecting unit 22. This ensures that a possible radial runout of the code wheel can be compensated when the incremental track is scanned.

Adjacent to the first detecting unit 22 there is a second detecting unit 21 arranged in the scanning unit to scan the coarse code tracks of the single data track on the code wheel. The second detecting unit 22 comprises three separate photodetectors 21U, 21V, 21W of rectangular shape. They have a width $W_{ABS}$ along the measuring direction and a length $I_{ABS}$ perpendicular to the measuring direction. In a preferred embodiment of the inventive encoder these parameters are given by $W_{ABS}=250$ $\mu$m and $I_{ABS}=100$ $\mu$m.

The photodetectors 21U, 21V, 21W of the second detecting unit are arranged parallel to each other whereas their longitudinal axis coincide with the measuring direction or are parallel oriented therewith. By this arrangement it is possible to scan the coarse code tracks which are integrated together with the fine incremental track within a single data track. Each of the photodetectors 21U, 21V, 21W provides an analog output signal which is either in a HIGH state or in a LOW state depending on the area of the code track which is actually scanned. So scanning of a clear code area provides an analog HIGH signal whereas scanning of an opaque area provides an analog LOW signal. These signals are processed in a subsequent processing unit 40 which comprises especially a number of comparators to transform the analog output signals of photodetectors 21U, 21V, 21W into digital output signals U, V, W having two possible logical states 1 or 0. With respect to the processing of the analog output signals reference is made to the pending U.S. patent application Ser. No. 08/980,047 assigned to the present assignee and which is incorporated herewith by reference. This application describes a method and arrangement for processing the analog output signals of photodetectors 21.U, 21V and 21W and transforming them into digital output signals U, V, W.

The inventive arrangement of the detecting units as described above ensures: a) that the incremental output signals A, B are not disturbed by the code track structure in the data track; and b) that the incremental track structure does not impact the generation of the absolute output signals U, V, W.

Figure 5:
FIG. 5 is a schematic illustration of the incremental output signals A, B and the commutation output signals U, V, W.
Figure 5:
Figure 5:
Figure 5:
Figure 5:
Figure 5:

The output signals A, B as well as U, V, W generated with the inventive encoder of FIGS. 1–4 are shown in FIG. 5. In addition to the signals A, B, U, V, W a further reference signal Z is shown in FIG. 5 which can be generated in well known manner. These signals can be processed in a suitable control of a brushless motor, for example.

Although only one embodiment of the inventive optical encoder has been described, it will be understood that many modifications and variations may be made. So it is possible to modify the spatial arrangement of the photodetectors within the groups of the first detecting unit to provide incremental output signals with other phase relationships. In general n photodetectors are arranged within one group which has an extension of TP in the measuring direction so that n incremental output signals result having a phase relationship of 360°/n with respect to each other. Additionally the number of groups of photodetectors in the first detecting unit can be varied in accordance with the available space in the scanning unit. Furthermore it is possible to choose other code structures in the coarse tracks to generate output signals from which an absolute position information can be derived. It will therefore be understood that, within the scope of the appended claims, the invention may be practiced otherwise than as specifically described.

What is claimed is:

1. An optical encoder for providing absolute and incremental position information of an object which moves along a certain measuring direction, the encoder comprising:

a single data track positioned along the measuring direction having a fine incremental track with a defined incremental graduation period and a plurality of separate coarse code tracks overlying said incremental graduation;

a light source for emitting light in the direction of the data track;

a first detecting unit arranged with respect to the data track for receiving light modulated by said incremental track;

wherein said first detecting unit comprises an array of separate photodetectors, each of the photodetectors of said first detecting unit providing phase shifted incremental output signals;

a second detecting unit arranged with respect to the data track for receiving light modulated by said plurality of code tracks;

wherein said second detecting unit having a number of separate photodetectors and the number of photodetectors being equal to the number of code tracks;

wherein the combination of the output signals of the photodetectors of said second detecting unit provides absolute position information.

2. An optical encoder as claimed in claim 1, wherein said data track has three separate coarse code tracks.

3. An optical encoder as claimed in claim 1, wherein said data track is circumferentially arranged on a code wheel.

4. An optical encoder as claimed in claim 3, wherein said code wheel is mounted on a shaft.

5. An optical encoder as claimed in claim 4, wherein said fine incremental graduation has alternately arranged transparent areas and opaque areas, all of them having a same width and a same length.

6. An optical encoder as claimed in claim 3, wherein each of said three coarse code tracks has four transparent areas and four opaque areas alternately arranged around the circumference of the code wheel.

7. An optical encoder as claimed in claim 6, wherein said three code tracks are shifted with respect to each other by a predetermined angle so that a certain number of circumferential ranges can be determined absolutely from the output signals of the second detecting unit.

8. An optical encoder as claimed in claim 1, wherein said incremental graduation consists of alternately arranged rectangular areas with different optical properties.

9. An optical encoder according to claim 8 wherein the rectangular areas each have a longitudinal axis that is perpendicular with respect to the measuring direction.

10. An optical encoder as claimed in claim 2, wherein said at least three separate coarse code tracks each consist of alternately arranged code areas with different optical properties.

11. An optical encoder according to claim 10 wherein the code areas each have a longitudinal axis that is parallel with the measuring direction.

12. An optical encoder as claimed in claim 1, wherein said photodetectors of said first detecting unit having a rectangular shape.

13. An optical encoder according to claim 12 wherein the photodetectors each have longitudinal axis arranged perpendicularly to the measuring direction.

14. An optical encoder as claimed in claim 12, wherein adjacent photodetectors of said first detecting unit are arranged with respect to each other, so that incremental output signals result from adjacent photodetectors which are phase shifted by 90°.

15. An optical encoder as claimed in claim 12, wherein said photodetectors of said second detecting unit having a rectangular shape and being arranged adjacent to the photodetectors of said first detecting unit.

16. An optical encoder as claimed in claim 15 wherein the photodetectors of the second detecting unit each have a longitudinal axis arranged perpendicularly to the longitudinal axis of said photodetectors of said first detecting unit.

17. An optical encoder as claimed in claim 14, wherein each fourth photodetector is connected.

18. An optical rotary encoder for providing incremental output signals and commutation output signals suitable for controlling a brushless motor, the encoder comprising:
a single circular data track arranged on a code wheel, having a fine incremental track with a defined incremental graduation period and three separate concentrically arranged coarse code tracks overlying said incremental graduation;
a light source for emitting light in the direction of the data track;
a first detecting unit arranged with respect to the data track for receiving light modulated by said incremental track;
wherein said first detecting unit comprises an array of separate photodetectors, each of the photodetectors of said first detecting unit providing phase shifted incremental output signals;
wherein those photodetectors of said first detecting unit are connected electrically with each other which provide output signals with the same phase relationship;
a second detecting unit arranged with respect to the data track for receiving light modulated by said plurality of code tracks;
wherein said second detecting unit has three separate photodetectors;
wherein the combination of the output signals of the photodetectors of said second detecting unit provides absolute position information within a certain angular range.

19. An optical encoder as claimed in claim 18, wherein said fine incremental track has alternately arranged opaque and clear areas, said areas having a length in radial direction which is bigger than the width of said three parallel arranged code tracks in radial direction.

20. An optical encoder as claimed in claim 18, wherein said coarse code tracks each having four clear areas and four opaque areas alternately arranged in circumferential direction, wherein said three code tracks being shifted with respect to each other by 15°.

21. An optical encoder as claimed in claim 18, wherein said first detecting unit includes a plurality of groups of four photodetectors, wherein each of said groups has a length which corresponds to one graduation period of said fine incremental graduation and wherein said photodetectors being arranged with respect to each other so that the output signals of adjacent photodetectors being phase shifted by 90°.

22. An optical encoder as claimed in claim 18, wherein said three photodetectors of said second detecting unit being connected with a processing unit which transforms the generated analog signals into logical output signals.

23. An optical encoder for providing absolute and incremental position information of an object which moves along a certain measuring direction, the encoder comprising:
a single data track positioned along the measuring direction having a fine incremental track with a defined incremental graduation period and a plurality of separate coarse code tracks overlying said incremental graduation;
a first detecting unit arranged with respect to the data track for receiving light modulated by said incremental track;
a second detecting unit having a number of separate photodetectors and arranged with respect to the data track for receiving light modulated by said plurality of code tracks;
wherein the combination of the output signals of the photodetectors of said second detecting unit provides absolute position information.

24. An optical encoder according to claim 23 wherein said first detecting unit comprises an array of separate photodetectors, each of the photodetectors of said first detecting unit providing phase shifted incremental output signals, wherein the number of separate photodetectors of said second detecting unit being equal to the number of code tracks.

* * * * *